(12) United States Patent
Yun

(10) Patent No.: US 10,270,375 B2
(45) Date of Patent: Apr. 23, 2019

(54) VEHICLE MOTOR CONTROL APPARATUS AND METHOD

(71) Applicants: Hyundai Motor Company, Seoul (KR); Kia Motors Corporation, Seoul (KR)

(72) Inventor: Jeong Gi Yun, Seoul (KR)

(73) Assignees: Hyundai Motor Corporation, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 15/695,912

(22) Filed: Sep. 5, 2017

(65) Prior Publication Data

US 2018/0287529 A1    Oct. 4, 2018

(30) Foreign Application Priority Data

Apr. 4, 2017 (KR) ........................ 10-2017-0043668

(51) Int. Cl.
  *H02P 1/18*      (2006.01)
  *H02P 7/00*      (2016.01)
  *B60N 2/02*      (2006.01)

(52) U.S. Cl.
  CPC .......... *H02P 7/0094* (2013.01); *B60N 2/0232* (2013.01); *H02P 1/18* (2013.01); *B60N 2002/0272* (2013.01); *H02P 2203/03* (2013.01)

(58) Field of Classification Search
  CPC ........ H02P 7/0094; H02P 1/18; B60N 2/0232
  USPC .................................................. 318/400.33
  See application file for complete search history.

(56) References Cited

U.S. PATENT DOCUMENTS

| | | | | |
|---|---|---|---|---|
| 4,896,126 A | * | 1/1990 | Siepmann | .............. H01H 50/46 335/244 |
| 5,793,171 A | * | 8/1998 | Hayashi | ................... B60R 1/07 318/434 |
| 6,049,182 A | | 4/2000 | Nakatani et al. | |
| 8,823,304 B2 | | 9/2014 | Fich et al. | |
| 2001/0035688 A1 | | 11/2001 | Sawada et al. | |
| 2003/0122515 A1 | * | 7/2003 | Lutter | ................... H02P 7/0094 318/466 |
| 2004/0246637 A1 | | 12/2004 | Tanaka et al. | |
| 2006/0166678 A1 | | 7/2006 | Karaoguz et al. | |

(Continued)

FOREIGN PATENT DOCUMENTS

| | | |
|---|---|---|
| EP | 2 787 629 A1 | 10/2014 |
| JP | 2000-250629 A | 9/2000 |

(Continued)

*Primary Examiner* — Kawing Chan
(74) *Attorney, Agent, or Firm* — Morgan, Lewis & Bockius LLP

(57) ABSTRACT

A vehicle motor control apparatus may include a motor device, a detecting device configured to detect a ripple voltage of the motor device and a controller configured to control driving of the motor device according to the ripple voltage detected by the detecting device, wherein the controller is configured to analyze the detected ripple voltage, measures a time required for a value of the ripple voltage to be maintained within a reference range for a predetermined time after reaching the reference range, and determines a compensation value according to the measured time, when the motor device stops. The controller applies the determined compensation value to control driving of the motor device, when the motor device is driven again.

20 Claims, 7 Drawing Sheets

(56) References Cited

U.S. PATENT DOCUMENTS

| | | | | |
|---|---|---|---|---|
| 2010/0171457 A1* | 7/2010 | Letor | ................... | G01P 3/48 |
| | | | | 318/490 |
| 2014/0001815 A1 | 1/2014 | Tanaka et al. | | |
| 2014/0077780 A1* | 3/2014 | Teong | ................... | G05F 1/46 |
| | | | | 323/282 |

FOREIGN PATENT DOCUMENTS

| | | |
|---|---|---|
| JP | 2005-323488 A | 11/2005 |
| JP | 2014-7804 A | 1/2014 |

* cited by examiner

VEHICLE MOTOR CONTROL APPARATUS AND METHOD

CROSS-REFERENCE TO RELATED APPLICATION

The present application claims priority to Korean Patent Application No. 10-2017-0043668, filed on Apr. 4, 2017, the entire contents of which is incorporated herein for all purposes by this reference.

BACKGROUND OF THE INVENTION

Field of the Invention

The present invention relates to a vehicle motor and, more particularly, to a vehicle motor control apparatus and method.

Discussion of the Related Art

In general, a vehicle includes various motors mounted therein. Each motor may move an object according to a control signal.

That is, such motors may move various objects in a vehicle, such as vehicle seats, according to control signals of a control device.

Existing vehicle motor control methods include a motor control method using a hall sensor and a motor control method using ripple current. However, when a motor operates after stoppage thereof, the operation position of the motor cannot be accurately measured.

In particular, after the motor stops, the operation position of the motor may be changed according to external load conditions.

In this case, a conventional motor control apparatus cannot accurately measure the operation position of the motor, which has been changed according to external load conditions, and thus cannot compensate for operation errors of the motor. Such errors may be accumulated, deteriorating reliability of a control device.

Accordingly, there is a need for a vehicle motor control method capable of accurately measuring an operation position of a motor changed according to external load conditions to compensate for errors.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle motor control apparatus and method that substantially obviate one or more problems due to limitations and disadvantages of the related art.

Various aspects of the present invention are directed to providing a vehicle motor control apparatus and method, which is configured for analyzing a ripple voltage of the motor, accurately measuring an operation position of the motor and compensating for an error based on the operation position of the motor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure pointed out in the written description and claims hereof as well as the appended drawings.

To achieve these objects and other advantages and in accordance for the invention, as embodied and broadly described herein, a vehicle motor control apparatus includes a motor device, a detecting device configured to detect a ripple voltage of the motor device, and a controller configured to control driving of the motor device according to the ripple voltage detected by the detecting device, wherein the controller analyzes the detected ripple voltage, measures a time required for a value of the ripple voltage to be maintained within a reference range for a predetermined time after reaching the reference range, and determines a compensation value according to the measured time, when the motor device stops, and applies the determined compensation value to control driving of the motor device, when the motor device is driven again.

According to various aspects of the present invention, a vehicle motor control method of a control apparatus for controlling a motor of a vehicle includes stopping the motor when operation for stopping the motor is requested, detecting a ripple voltage of the motor when the motor stops, determining whether a value of the ripple voltage is maintained in a reference range for a predetermined time after reaching the reference range, measuring a time required for the value of the ripple voltage to be maintained for the predetermined time, upon determining that the value of the ripple voltage is maintained for the predetermined time after reaching the reference range, determining a compensation value according to the measured time, when the time is measured and applying the determined compensation value to control driving of the motor, when operation for driving the motor is requested.

In the vehicle motor control apparatus and method according to at least one exemplary embodiment of the present invention, by analyzing the ripple voltage of the motor, it is possible to accurately measure the operation position of the motor and to compensate for an error based on the measured operation position of the motor. Therefore, it is possible to improve motor control reliability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
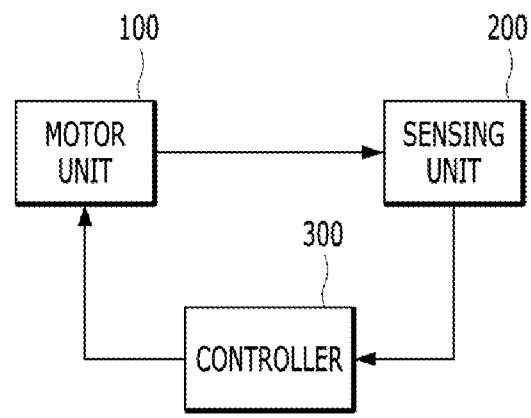
FIG. 1 and FIG. 2 are block diagrams illustrating a vehicle motor control apparatus according to an exemplary embodiment of the present invention.

It may be understood that the appended drawings are not necessarily to scale, presenting a somewhat simplified representation of various features illustrative of the certain principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification, when a certain portion "includes" a certain component, this indicates that the other components are not excluded, but may be further included unless specially described otherwise. The terms "unit", "-or/er" and "module" described in the specification indicate a device for processing at least one function or operation, which may be implemented by hardware, software or a combination thereof.

Throughout the specification, when a certain portion "includes" a certain component, this indicates that the other components are not excluded, but may be further included unless specially described otherwise. In addition, the same reference numerals designate the same constituent elements throughout the description of the drawings.

Hereinafter, a vehicle motor control apparatus and method applicable to embodiments of the present invention will be described in detail with reference to FIGS. 1 to 14.

Figure 2:
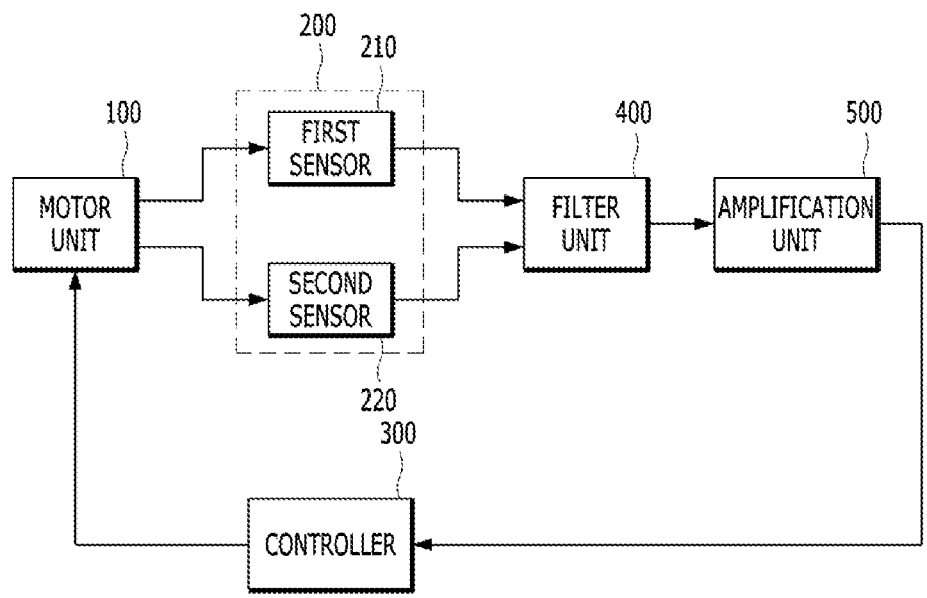

FIG. 1 and FIG. 2 are block diagrams illustrating a vehicle motor control apparatus according to an exemplary embodiment of the present invention.

As shown in FIG. 1, the vehicle motor control apparatus of the present invention may include a motor device 100, a detecting device 200 and a controller 300.

Here, the motor device 100 may perform a function configured for moving an object mounted in a vehicle.

For example, the motor device 100 may move a vehicle seat forward or backward, without being limited thereto.

The detecting device 200 may detect the ripple voltage of the motor device 100.

The detecting device 200 may include a first sensor 210 for detecting the number of rotation and the rotation direction of the motor device 100 and a second sensor 200 for detecting the ripple voltage generated after operation for stopping the motor device 100, as shown in FIG. 2.

For example, the first sensor 210 and the second sensor 220 may be shunt resistors, without being limited thereto.

In some cases, the vehicle motor control apparatus of the present invention may further include a filter device 400 and an amplification device 500, as shown in FIG. 2.

The filter device 400 may remove noise of the ripple voltage detected by the detecting device 200 and the amplification device 500 may amplify the ripple voltage, noise of which has been removed by the filter device 400.

The controller 300 may control driving of the motor device 100 according to the ripple voltage detected by the detecting device 200.

The controller 300 may analyze the detected ripple voltage when the motor device 100 is stopped, measure a time required for the value of the ripple voltage to be maintained in a reference range for a predetermined time, determine a compensation value according to the measured time, and apply the determined compensation value to control driving of the motor device 100 when the motor device 100 is driven again.

For example, when the time is measured, the controller 300 may check whether a relay chatter signal is present after a relay off time and measure the time from an end time of the relay chatter signal.

Here, the controller 300 may measure the time from the relay off time when the relay chatter signal is not present.

In addition, upon determining the compensation value, the controller 300 may compare the measured time with a predetermined reference value to determine an operation mode of the motor device 100 and may determine the compensation value according to the determined operation mode.

The predetermined reference value may be an average of a first measurement time measured according to a first operation condition of the motor device 100 and a second measurement time measured according to a second operation condition of the motor device 100.

At this time, the first measurement time may be an average of times repeatedly measured several times according to the first operation condition of the motor device 100, and the second measurement time may be an average of times repeatedly measured several times according to the second operation condition of the motor device 100.

For example, the first measurement time may refer to a time from a back-spin operation start time to a back-spin operation end time when the first operation condition of the motor device 100 is a back-spin generation condition.

The first measurement time may correspond to the case where a weight of a load applied to the motor device 100 is equal to or greater than a reference value when the first operation condition of the motor device 100 is a back-spin generation condition.

In some cases, when the first operation condition of the motor device 100 is a back-spin generation condition and the weight of the load applied to the motor device 100 is divided into a plurality of load weight ranges, the first measurement time may be divided into a plurality of measurement times according to the divided load weight ranges.

In addition, the second measurement time may be a time from an overrun operation start time to an overrun operation end time when the second operation condition of the motor device 100 is an overrun generation condition.

The controller 300 may determine the compensation value when the determined operation mode is a back-spin mode.

The compensation value may be the number of reverse-direction ripples.

In addition, the controller 300 may not determine the compensation value when the determined operation mode is an overrun mode.

Subsequently, the controller 300 may check whether a relay chatter signal is present after the relay off time before measuring the time, determine the compensation value of the relay chatter signal when the relay chatter signal is present and compensate for the ripple voltage according to the determined compensation value.

Here, the compensation value of the relay chatter signal may be obtained by determining an average of a ripple signal period after a relay chatter signal end time and a ripple signal period before the relay chatter signal end time and dividing the determined average by a time to the relay chattering end time.

In an exemplary embodiment of the present invention, it is possible to improve reliability of the operation position of the motor by analyzing the current characteristics of the motor changed according to external load conditions after the operation for stopping the motor to apply an appropriate compensation logic.

Accordingly, in an exemplary embodiment of the present invention, it is possible to reduce the error of the operation position of the motor and to improve reliability of the entire system.

Figure 3:
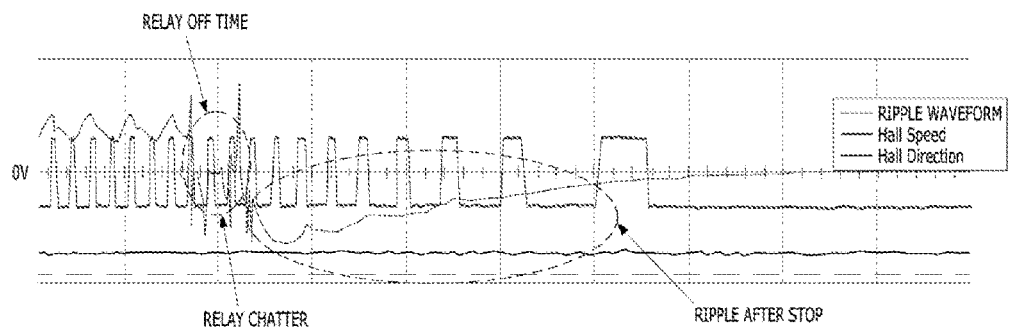
FIG. 3 and FIG. 4 are diagrams illustrating motor operation according to backward movement of a vehicle seat.
Figure 4:
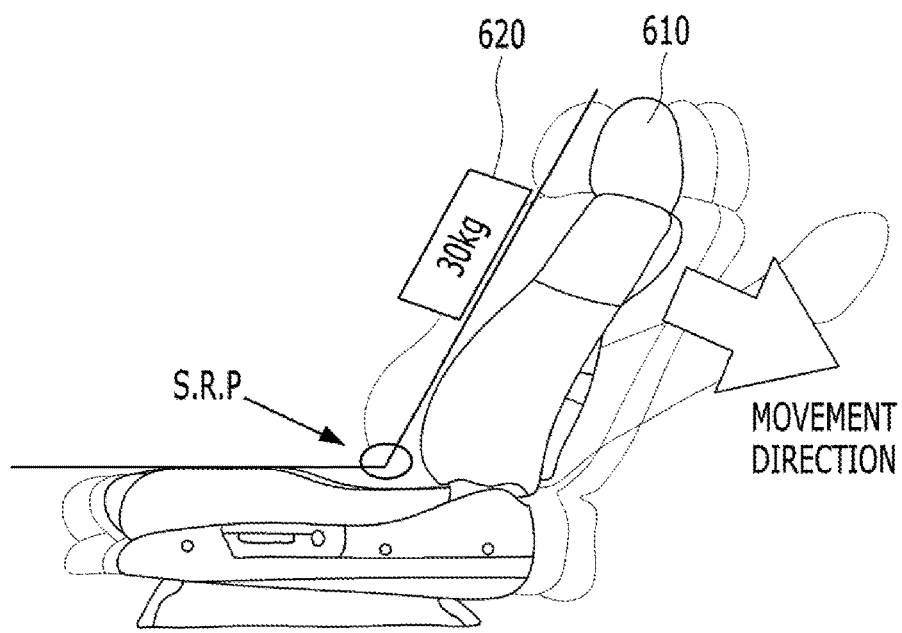

FIG. 3 and FIG. 4 are diagrams illustrating motor operation according to backward movement of a vehicle seat.

FIG. 3 is a graph showing ripple properties according to operation of a recliner motor configured for moving a vehicle seat backward and FIG. 4 is a diagram showing backward movement of a vehicle seat according to operation of the recliner motor.

As shown in FIG. 4, when the incliner motor stops while performing operation for moving the vehicle seat, to which a load 620 of about 30 kg is applied, backward, the ripple voltage properties shown in FIG. 3 may appear.

As shown in FIG. 3, the motor may output a negative ripple voltage after stop.

That is, the motor may output the ripple signal in the negative direction by back electromotive force after the relay off time.

Here, the motor may generate a residual ripple signal due to overrun operation generated by inertia after stop.

At this time, the residual ripple signal is generated by back electromotive force and thus may be output in a negative direction.

In the motor, it can be seen that the number of ripples increases when overrun operation increases.

Subsequently, after the motor stops, the ripple voltage value may converge on 0 V at a motor stop time.

In addition, when the load is applied to the motor in a motor movement direction, the number of residual ripples and the period thereof may increase after the motor stops.

Here, it can be seen that, when the load is applied to the motor in the motor movement direction, the number of times of overrun increases and the number of ripples in the negative direction increases.

It can be seen that the motor stop time increases until the ripple voltage value converges on 0 V.

In an exemplary embodiment of the present invention, the ripple waveform after the motor stops is analyzed to confirm the number of rotation and the stop time in the overrun direction of the motor.

That is, in an exemplary embodiment of the present invention, immediately after the motor stops, the ripple signal in the negative direction may be analyzed to estimate that the motor has performed overrun operation.

Figure 5:
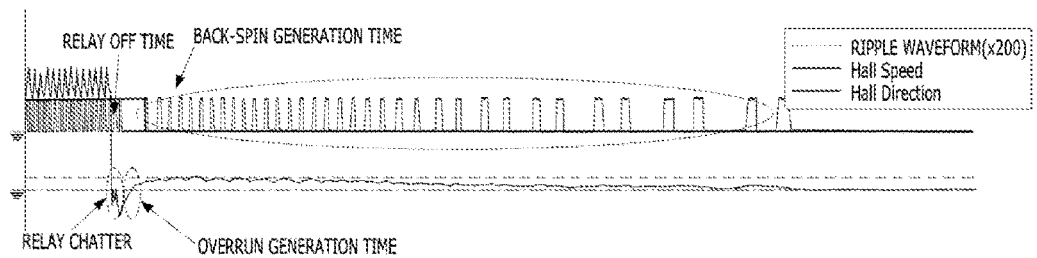
FIG. 5 and FIG. 6 are diagrams illustrating motor operation according to forward movement of a vehicle seat.
Figure 6:
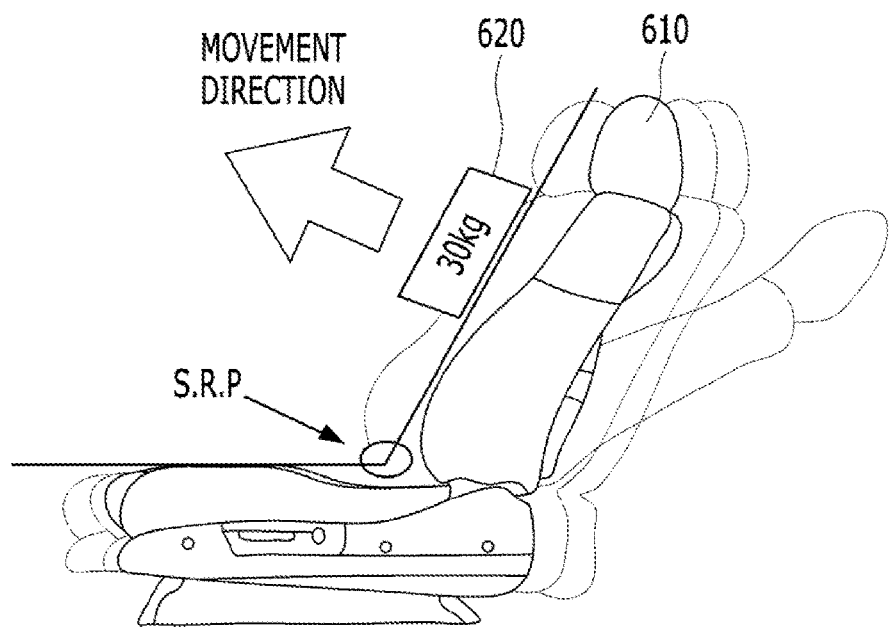

FIG. 5 and FIG. 6 are diagrams illustrating motor operation according to forward movement of a vehicle seat.

FIG. 5 is a graph showing ripple properties according to operation of a recliner motor configured for moving a vehicle seat forward and FIG. 6 is a diagram showing forward movement of a vehicle seat according to operation of a recliner motor.

As shown in FIG. 6, when the recliner motor stops while performing operation for moving the vehicle seat, to which a load 620 of about 30 kg is applied, forward, the ripple voltage properties shown in FIG. 5 may appear.

As shown in FIG. 6, the motor may output a positive ripple voltage after stop.

That is, the motor may output the ripple signal in the positive direction by the load after the relay off time.

Here, in the motor, after stop, overrun operation is cancelled or reduced by applying the load and then back-spin for rotating the motor in an opposite direction may be generated.

At this time, the ripple signal is generated by back electromotive force and thus may be output in the positive direction, which is opposite to the overrun waveform.

In the motor, the overrun waveform may be reduced by the load and the number of positive ripples may be increased.

Subsequently, after an overrun ripple is first generated, the rotation direction of the motor may be changed at an intersection time of 0V in the positive direction.

Next, after the motor stops, the ripple voltage value may converge on 0 V at a motor stop time.

In addition, when the load is applied in the direction opposite to the motor movement direction, the number of times of overrun may decrease and the number of ripples in the negative direction may increase.

It can be seen that the motor stop time increases until the ripple voltage value converges on 0 V.

In an exemplary embodiment of the present invention, the ripple waveform after the motor stops is analyzed to confirm change in rotation direction of the motor, the number of rotation of back-spin and a stop time.

That is, in an exemplary embodiment of the present invention, immediately after the motor stops, the ripple signal in the positive direction may be analyzed to estimate that the motor has performed back-spin operation.

FIG. 7, FIG. 8, FIG. 9, FIG. 10, and FIG. 11 are graphs illustrating a vehicle motor control method according to an exemplary embodiment of the present invention.

Figure 7:
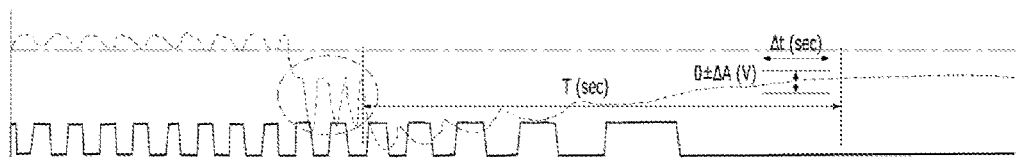
FIG. 7, FIG. 8, FIG. 9, FIG. 10, and FIG. 11 are graphs illustrating a vehicle motor control method according to an exemplary embodiment of the present invention.

As shown in FIG. 7, the controller of the present invention performs chattering prevention delay after relay off.

Next, the controller performs ripple detecting after finishing chattering prevention delay.

The controller may measure the value of the ripple voltage and a time T required for the value of the ripple voltage to be maintained for about $\Delta t$ after the value of the ripple voltage enters a range of about $0 \pm \Delta a$ (V).

Subsequently, the controller may recognize a first mode in which the weight of the load of A kg or more is applied in the opposite direction, when the time T is less than about $T_1$ ms.

In addition, the controller may recognize a second mode in which the weight of the load is less than B kg, the load is applied in the opposite direction, no load is applied or the load is applied in a normal direction, when the time T is equal to or greater than about $T_1$ ms.

Next, the controller may estimate a back-spin mode in the first mode and compensate for the number of ripples in the negative direction.

In addition, the controller may estimate an overrun mode in the second mode and may not compensate for the number of ripples.

The controller may define a reference value for determining switching of the first mode and the second mode as follows.

Figure 8:
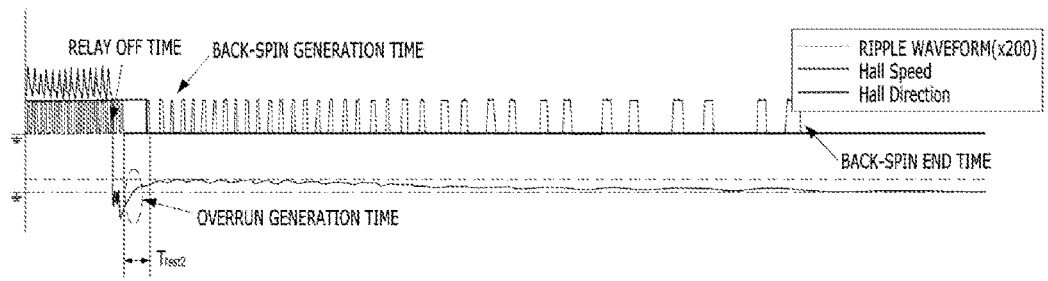
Figure 9:
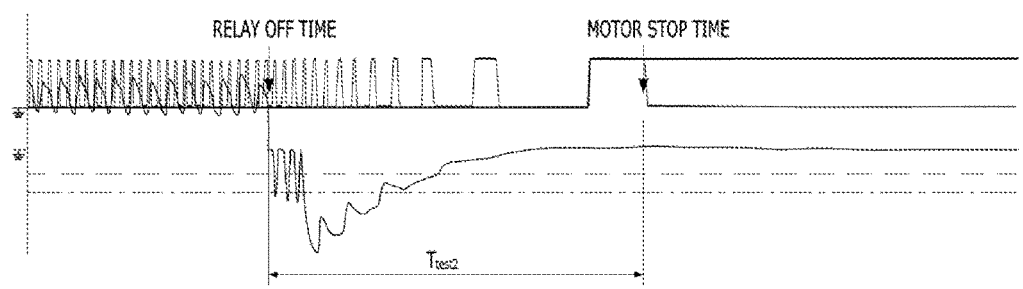

As shown in FIG. 8 and FIG. 9, in an exemplary embodiment of the present invention, an experimental environment may be configured to define the reference value of $T_1$ ms for determining the first mode and the second mode.

For example, in the experimental environment, a sensor for detecting direction and rotation is mounted in each motor of a vehicle seat, a load having a specific value is applied to the motor of the vehicle seat, and the motor operates to measure the waveform of the sensor.

Through analysis of the waveform of FIG. 8, a time when the direction of a yellow waveform of the sensor mounted in the motor is switched may be defined as a back-spin start time, a time when output of a last pulse of a green waveform of the sensor is finished may be defined as a back-spin end time, and a time from the back-spin start time and the back-spin end time may be defined as $T_{test1}$.

Subsequently, after repeatedly performing measurement under the back-spin generation condition several times per motor, an average of the measured value $T_{test1}$ may be defined as $T_{test1\_av}$.

In addition, as shown in FIG. 9, in an exemplary embodiment of the present invention, the motor operates under a no-load condition, in which the applied load is removed, to measure the waveform of the sensor.

Here, a time when the direction of a yellow waveform of the sensor is switched and output of a last pulse of a green waveform is finished may be defined as an overrun end time and an average of the measured value $T_{test2}$ after repeatedly performing measurement under the overrun generation condition several times per motor may be defined as $T_{test2\_av}$.

Subsequently, in an exemplary embodiment of the present invention, to select a reference time T for applying a back-spin compensation logic, an average of $T_{test1\_av}$ of the back-spin condition when the load is applied and $T_{test2\_av}$ of the overrun condition when no load is applied is obtained and then is selected as a value T for determining whether the compensation logic is applied.

That is, the time T may be determined by $(T_{test1\_av} + T_{test2\_av})/2$.

In addition, in an exemplary embodiment of the present invention, a compensation mode may be added between the first mode and the second mode divided according to the time T through the values $T_{test1\_av}$ measured by changing the capacity of the load.

Figure 10:
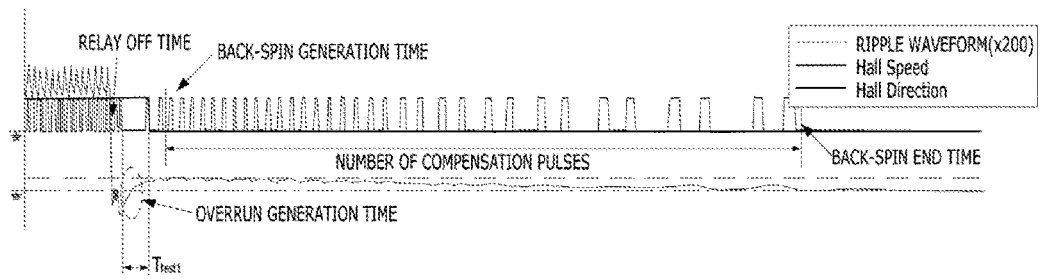

As a compensation pulse value of the back-spin value, an average of the number of green pulses generated after the direction of the yellow sensor is changed is applicable as shown in FIG. 10.

The motor may continuously rotate even when chattering is generated, after relay off.

Here, when the chattering value is detected without change or the chattering value is ignored through delay, an error may be generated in the number of counted ripples during the chattering generation period.

In an exemplary embodiment of the present invention, it is possible to improve reliability of the number of counted ripples by applying a compensation logic.

Figure 11:
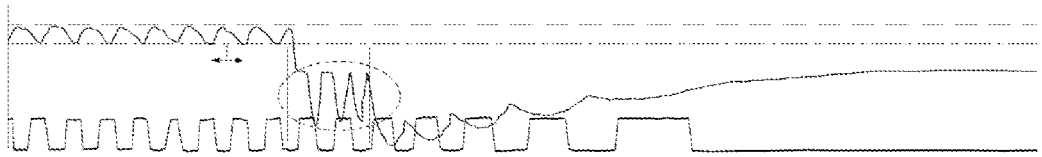

As shown in FIG. 11, in an exemplary embodiment of the present invention, a timer for recognizing a ripple waveform operates.

In an exemplary embodiment of the present invention, it is possible to measure the period of each waveform through the timer when recognition of the ripple waveform is finished.

Subsequently, in an exemplary embodiment of the present invention, upon relay off, detecting of the ripple may be stopped and delay operation may be performed by a time Td.

Here, the timer which has operated before relay off may continuously operate.

Next, in an exemplary embodiment of the present invention, after the time Td, detecting of the ripple restarts, the period of the waveform of a first recognized ripple in the negative direction is measured, and a time Ts until a start time of the first recognized ripple is measured through the timer and stored in a buffer.

In an exemplary embodiment of the present invention, an average of the period of the ripple generated after the time Td and the period of the ripple measured before relay off may be obtained and divided by Ts, determining a compensation value.

Subsequently, in an exemplary embodiment of the present invention, the number of ripples may be estimated through the determined compensation value to compensate for the error.

In an exemplary embodiment of the present invention, as shown in FIG. 7, when the motor stops, the detected ripple voltage may be analyzed, a time required for the value of the ripple voltage to be maintained in the reference range for a predetermined time after reaching the reference range may be measured, and a compensation value may be determined according to the measured time. When the motor is driven again, the determined compensation value may be applied to control driving of the motor.

For example, in an exemplary embodiment of the present invention, when the time is measured, whether a relay chatter signal is present after the relay off time is determined. When the relay chattering time is present, the time may be measured from a relay chatter signal end time.

Here, in an exemplary embodiment of the present invention, when the relay chatter signal is not present, the time may be measured from the relay off time.

In addition, in an exemplary embodiment of the present invention, the measured time may be compared with a predetermined reference value to determine the operation mode of the motor and the compensation value may be determined according to the determined operation mode.

Here, the predetermined reference value may be an average of a first measurement time measured according to the first operation condition of the motor as shown in FIG. 8 and a second measurement time measured according to the second operation condition as shown in FIG. 9.

At this time, the first measurement time may be an average of times repeatedly measured several times according to the first operation condition of the motor and the second measurement time may be an average of times repeatedly measured several times according to the second operation condition of the motor.

For example, as shown in FIG. 8, the first measurement time may be a time from the back-spin operation start time to the back-spin operation end time when the first operation condition of the motor is a back-spin generation condition.

In addition, the first measurement time may correspond to the case where the weight of a load applied to the motor is equal to or greater than a reference value when the first operation condition of the motor is a back-spin generation condition.

In some cases, as shown in FIG. 10, when the first operation condition of the motor is a back-spin generation condition and the weight of the load applied to the motor is divided into a plurality of load weight ranges, the first measurement time may be divided into a plurality of times according to the divided load weight ranges.

In addition, as shown in FIG. 9, the second measurement time may be a time from an overrun operation start time to an overrun operation end time when the second operation condition of the motor is an overrun generation condition.

In an exemplary embodiment of the present invention, when the determined operation mode is the back-spin mode, the compensation value may be determined.

Here, the compensation value may be the number of ripples in the negative direction.

In addition, when the determined operation mode is an overrun mode, the compensation value may not be determined.

Subsequently, in an exemplary embodiment of the present invention, as shown in FIG. 11, whether a relay chatter signal is present after the relay off time is checked before measuring the time, the compensation value of the relay chatter signal is determined when the relay chatter signal is present, and the ripple voltage is compensated for according to the determined compensation value.

Here, the compensation value of the relay chatter signal may be obtained by determining an average of a ripple signal period after a relay chatter signal end time and a ripple signal period before the relay chatter signal end time and dividing the determined average by a time to the relay chattering end time.

Figure 12:
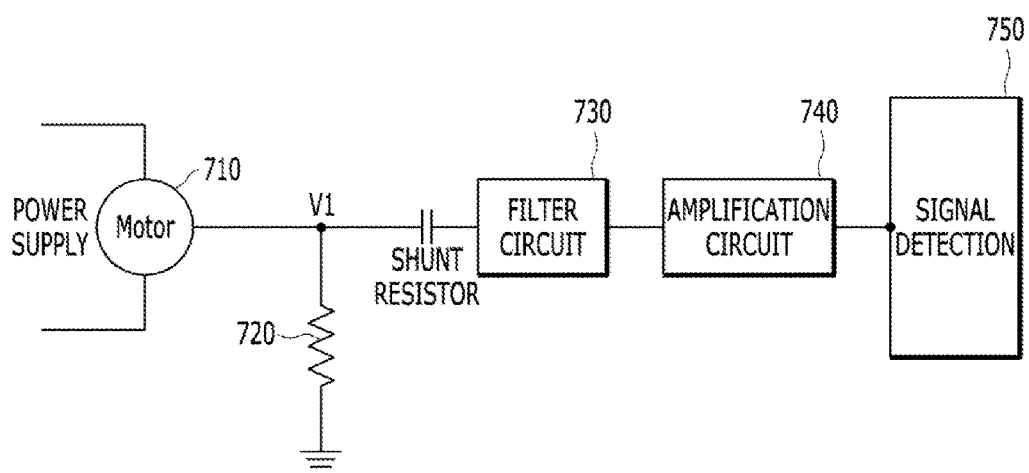
FIG. 12, and FIG. 13 are diagrams illustrating a vehicle motor control apparatus including a filter circuit and an amplification circuit.
Figure 13:
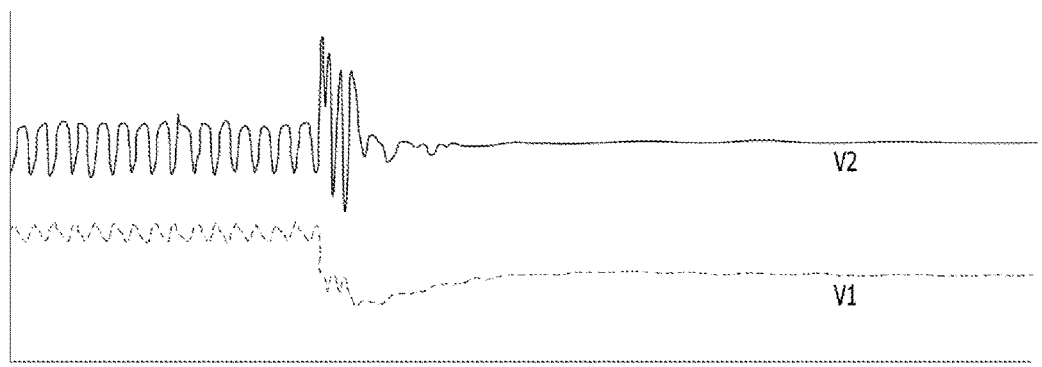

FIG. 12, and FIG. 13 are diagrams illustrating a vehicle motor control apparatus including a filter circuit and an amplification circuit.

As shown in FIG. 12, the present invention may include a motor device 710, a detecting device 720, a filter device 730, an amplification device 740 and a controller 750.

The detecting device 710 may be a shunt resistor connected between the motor device 710 and the filter device 730.

At this time, the detecting device 710 may detect a ripple voltage generated after operation for stopping the motor device.

The filter device 730 may remove noise of the ripple voltage detected by the detecting device 720 and the amplification device 740 may amplify the ripple voltage, noise of which has been removed by the filter device 730.

Subsequently, the controller 750 may control driving of the motor device 710 according to the ripple voltage.

Here, the controller 750 may analyze the detected ripple voltage when the motor device 710 stops, measure a time required for the value of the ripple voltage to be maintained in the reference range for a predetermined time after reaching the reference range, and determine a compensation value according to the measured time. When the motor is driven again, the determined compensation value may be applied to control driving of the motor device 710.

As shown in FIG. 13, the waveform V1 of the ripple voltage generated at a node between the motor device 710 and the filter device 730 and the waveform V2 of the ripple voltage generated at a node between the amplification device 740 and the controller 750 are shown.

When the filter circuit and the amplification circuit are added to the vehicle motor control apparatus of the present invention, the waveform of the ripple voltage can be amplified to accurately detect the operation position of the motor and an error can be compensated for according to the operation position of the motor to improve motor control reliability.

Figure 14:
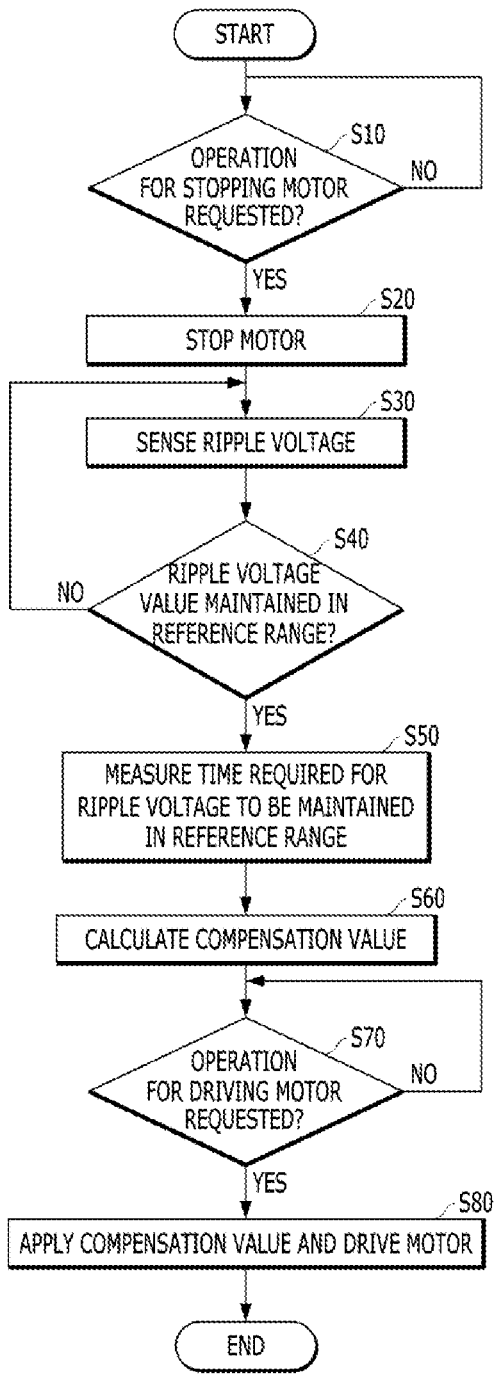
FIG. 14 is a flowchart illustrating a vehicle motor control method according to an exemplary embodiment of the present invention.

FIG. 14 is a flowchart illustrating a vehicle motor control method according to an exemplary embodiment of the present invention.

As shown in FIG. 14, the controller checks whether operation for stopping the motor is requested (S10).

Next, the controller stops the motor when the operation for stopping the motor is requested (S20).

When the motor stops, the controller detects the ripple voltage of the motor (S30).

Subsequently, the controller checks whether the value of the ripple voltage is maintained in a reference range for a predetermined time after reaching the reference range (S40).

Next, the controller measures a time required for the value of the ripple voltage to be maintained for the predetermined time after reaching the reference range (S50).

Here, when measuring the time, the controller may check whether a relay chatter signal is present after a relay off time and measure the time from a relay chatter signal end time when the relay chatter signal is present.

In some cases, the controller may check whether a relay chatter signal is present after the relay off time, before measuring the time, determine the compensation value of the relay chatter signal when the relay chatter signal is present, and compensate for the ripple voltage according to the determined compensation value.

When the time required for the ripple voltage to be maintained for the predetermined time is measured, the controller determines the compensation value according to the measured time (S60).

Here, the controller may compare the measured time with a predetermined reference value to determine the operation mode of the motor and determine the compensation value according to the determined operation mode (S70).

For example, the controller may determine the compensation value when the determined operation mode is a back-spin mode and may not determine the compensation value when the determined operation mode is an overrun mode.

Subsequently, the controller applies the determined compensation value to drive the motor when operation for driving the motor is requested (S80).

In an exemplary embodiment of the present invention, by analyzing the ripple voltage of the motor, it is possible to accurately measure the operation position of the motor and to compensate for an error based on the measured operation position of the motor. Therefore, it is possible to improve motor control reliability.

The present invention may be implemented as code that can be written to a computer-readable recording medium and can thus be read by a computer. Examples of the computer-readable recording medium include a hard disk drive (HDD), a solid state drive (SSD), a silicon disk drive (SDD), a ROM, a RAM, a CD-ROM, a magnetic tape, a floppy disk, an optical data storage, and a carrier wave (e.g., data transmission over the Internet).

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle motor control apparatus comprising:
   a motor device;
   a detecting device configured to detect a ripple voltage of the motor device; and
   a controller configured to control driving of the motor device according to the ripple voltage detected by the detecting device,
   wherein the controller
   is configured to analyze the detected ripple voltage, to measure a time required for a value of the ripple voltage to be maintained within a reference range for a predetermined time after reaching the reference range, and to determine a compensation value according to the measured time, when the actuator device stops, and
   is configure to apply the determined compensation value to control driving of the motor device, when the motor device is driven again.

2. The vehicle motor control apparatus according to claim 1, wherein the detecting device includes:
   a first sensor configured to detect a number of rotation and a rotation direction of the motor device; and
   a second sensor configured to detect the ripple voltage generated after operation for stopping the motor device.

3. The vehicle motor control apparatus according to claim 2, wherein the first and second sensors are shunt resistors.

4. The vehicle motor control apparatus according to claim 1, further including:
   a filter device configured to remove noise of the ripple voltage detected by the detecting device; and
   an amplification device configured to amplify the ripple voltage, noise of which has been removed by the filter device.

5. The vehicle motor control apparatus according to claim 4, wherein, when the time is measured, the controller is configured to check whether a relay chatter signal is present after a relay off time and is configured to measure a time from an end time of the relay chatter signal, when the relay chatter signal is present.

6. The vehicle motor control apparatus according to claim 5, wherein the controller is configured to measure a time from the relay off time when the relay chatter signal is not present.

7. The vehicle motor control apparatus according to claim 1, wherein the controller is configured to compare the measured time with a predetermined reference value to determine an operation mode of the motor device and is configured to determine the compensation value according to the determined operation mode, upon determining the compensation value.

8. The vehicle motor control apparatus according to claim 7, wherein the controller is configured to determine the compensation value when the determined operation mode is a back-spin mode.

9. The vehicle motor control apparatus according to claim 8, wherein the compensation value is a number of ripples in a negative direction.

10. The vehicle motor control apparatus according to claim 7, wherein the controller does not determine the compensation value when the determined operation mode is an overrun mode.

11. The vehicle motor control apparatus according to claim 7, wherein the predetermined reference value is an average of a first measurement time measured according to a first operation condition of the motor device and a second measurement time measured according to a second operation condition of the motor device.

12. The vehicle motor control apparatus according to claim 11,
    wherein the first measurement time is an average of times repeatedly measured predetermined times according to the first operation condition of the actuator device, and
    wherein the second measurement time is an average of times repeatedly measured predetermined times according to the second operation condition of the motor device.

13. The vehicle motor control apparatus according to claim 11, wherein the first measurement time is a time from a back-spin operation start time to a back-spin operation end time when the first operation condition of the motor device is a back-spin generation condition.

14. The vehicle motor control apparatus according to claim 13, wherein the first measurement time corresponds to a case where a weight of a load applied to the motor device is equal to or greater than a reference value, when the first operation condition of the motor device is a back-spin generation condition.

15. The vehicle motor control apparatus according to claim 13, wherein, when the first operation condition of the motor device is a back-spin generation condition and a weight of a load applied to the motor device is divided into a plurality of weight ranges, the first measurement time is divided into a plurality of measurement times according to the divided weight ranges.

16. The vehicle motor control apparatus according to claim 11, wherein the second measurement time is a time measured from an overrun operation start time to an overrun operation end time when the second operation condition of the motor device is an overrun generation condition.

17. The vehicle motor control apparatus according to claim 1, wherein the controller is configured to check whether a relay chatter signal is present after a relay off time, before measuring a time, is configured to determine a compensation value of the relay chatter signal when the relay chatter signal is present, and configured to compensate for the ripple voltage according to the determined compensation value.

18. The vehicle motor control apparatus according to claim 17, wherein the compensation value of the relay chatter signal is obtained by determining an average of a ripple signal period after an end time of the relay chatter signal and a ripple signal period before the end time of the relay chatter signal and dividing the determined average by a time to the end time of the relay chatter signal.

19. A vehicle motor control method of a control apparatus for controlling a motor of a vehicle, the method comprising:

stopping the motor when operation for stopping the motor is requested;

detecting a ripple voltage of the motor when the motor stops;

determining whether a value of the ripple voltage is maintained in a reference range for a predetermined time after reaching the reference range;

measuring a time required for the value of the ripple voltage to be maintained for the predetermined time, when upon determining that the value of the ripple voltage is maintained for the predetermined time after reaching the reference range;

determining a compensation value according to the measured time, when the time is measured; and applying the determined compensation value to control driving of the motor, when operation for driving the motor is requested.

20. The vehicle motor control method according to claim 19, wherein the determining the compensation value includes comparing the measured time with a predetermined reference value to determine an operation mode of the motor and determining the compensation value according to the determined operation mode.

* * * * *